United States Patent
Tresp et al.

(10) Patent No.: US 6,311,172 B1
(45) Date of Patent: Oct. 30, 2001

(54) METHOD FOR DETERMINATION OF WEIGHTS, SUITABLE FOR ELIMINATION, OF A NEURAL NETWORK USING A COMPUTER

(75) Inventors: Volker Tresp, München; Hans-Georg Zimmermann, Starnberg/Percha; Ralph Neuneier, München, all of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/155,197

(22) PCT Filed: Mar. 11, 1997

(86) PCT No.: PCT/DE97/00473

§ 371 Date: Sep. 23, 1998

§ 102(e) Date: Sep. 23, 1998

(87) PCT Pub. No.: WO97/36248

PCT Pub. Date: Oct. 2, 1997

(30) Foreign Application Priority Data

Mar. 25, 1996 (DE) .............................................. 196 11 732

(51) Int. Cl.⁷ ...................................................... G06F 15/18

(52) U.S. Cl. ................................. 706/20; 706/16; 706/25

(58) Field of Search .................................. 706/16, 20, 25

(56) References Cited

U.S. PATENT DOCUMENTS

| | | | |
|---|---|---|---|
| 5,559,929 | * 9/1996 | Wasserman | 706/25 |
| 5,636,326 | * 6/1997 | Stork et al. | 706/25 |
| 5,819,226 | * 10/1998 | Gopinathan et al. | 705/1 |

OTHER PUBLICATIONS

Stalin et al, "Vectorized Backpropagation and Automatic Pruning for MLP Network Optimization," IEEE ICONN Mar.–Apr. 1993.*

Hu et al, "Structural Simplification of a Feed–Forward Multilayer Perception Artificial Neural Network," IEEE ICASSP Apr. 1991.*

Ledoux et al, "Two Original Weight Pruning Methods Based on Statistical Tests and Rounding Techniques", IEE Proceedings of Vision, Image and Signal Processing Aug. 1994.*

Proceeding of the International Joint Conference on Neural Network, Baltimore, Jun. 7–11, 1992, vol. 3, Institute of Electrical & Electronics Engineers, XP000340469, F. Hergert et al, "A Comparsion of Weight Elimination Methods for Reducing Complexity in Neural Networks", pp. 980–987.

Proceedings of the Third International Conference on Neural Networks in the Capital Markets, Proceedings of the 3$^{rd}$ International Conference on Neural Networks in Financial Engineering, London, Oct. 1996, XP000675785, A.S. Weigend et al, "Clearning Cleaning and Learning of Data Structures", pp. 511–522.

(List continued on next page.)

*Primary Examiner*—George B. Davis
(74) *Attorney, Agent, or Firm*—Schiff Hardin & Waite (57) ABSTRACT

The training phase of a neural network NN is stopped before an error function, which is to be minimized in the training phase, reaches a minimum (301). A first variable (EG) is defined using, for example, the optimal brain damage method or the optimal brain surgeon method, on the assumption that the error function is at the minimum. Furthermore, a second variable (ZG) is determined which provides an indication of the manner in which the value of the error function varies when a weight ($w_i$) is removed from the neural network (NN). The first variable (EG) and the second variable (ZG) are used to classify the weight ($w_i$) as being suitable or unsuitable for removal from the neural network (NN).

11 Claims, 4 Drawing Sheets

OTHER PUBLICATIONS

Proceedings of the International Conference on Neural Networks, San Francisco, Mar. 28–Apr. 1, 1993, XP000366793, B. Hassibi et al, Optimal Brain Surgeon and General Network Pruning, pp. 293–299.

Systems & Computers in Japan, vol. 23, No. 8, Jan. 1, 1992; XP000329647, M. Hagiwara, "Backpropagation with Selection–Reduction of Learning Time and Elimination of Hidden Units", pp. 46–54.

IEEE Transactions on Neural Networks, vol. 6, No. 6, Nov. 1, 1995, XP000536106, M. Cottrell et al, Neural Modeling for Time Series: A Statistical Stepwise Method for Weight Elimination, pp. 1355–13641.

IEEE Transactions on Neural Networks, vol. 1, No. 2, Jun. 1990, Letters, E.D. Karnin, "A Simple Procedure for Pruning Back–Propagation Trained Neural Networks", pp. 239–242.

IEEE Transactions on Neural Networks, vol. 4, No. 5, Sep. 1993, Russell Reed, "Pruning Algorithms—A Survey", pp. 740–747.

Neural Networks, vol. 6, (1993), W. Finnoff et al, "Improving Model Selection by Nonconvergent Methods", pp. 771–783.

A. Zell, Simulation Neuronaler Netze [Simulation of neural networks], (1994), Addison–Wesley, $1^{st}$ Edition, ISBN 3–89319–554–8, pp. 319–328.

* cited by examiner

METHOD FOR DETERMINATION OF WEIGHTS, SUITABLE FOR ELIMINATION, OF A NEURAL NETWORK USING A COMPUTER

BACKGROUND OF THE INVENTION

The removal from a neural network of weights that have only a small information content in terms of training data to be approximated considerably improves the generalization characteristic of the neural network whose dimensionality has been reduced. Furthermore, a smaller number of training data items is required to train the reduced neural network. The rate of learning and the rate of classification in the test phase are also increased.

The removal of weights from a neural network is called pruning.

Various pruning methods are known. For example, in a first prior art A. Zell, Simulation Neuronaler Netze (Simulation of neural networks), (1994), Addison-Wesley, 1st Edition, ISBN 3-89319-554-8, pp. 319–328 discloses a so-called optimal brain damage (OBD) method. In this method, the second derivatives of the error function are used on the basis of the individual weights in the neural network, in order to select those weights which should be removed. This method has the disadvantage that it operates only subject to the precondition that the training phase has converged, that is to say that the error function, which is minimized during the training phase, has reached a local minimum or a global minimum of the error function. In this case, the disadvantage of this known method is primarily that, using this method, one may in general investigate only considerably overtrained neural networks for weights to be removed.

The method likewise described in the first prior art document is subject to the same precondition of convergence in the training phase, and thus to the same disadvantages as well. This method is called the optimal brain surgeon (OBS).

Furthermore, a method is known in which the training phase is stopped before a minimum is reached in the error function. This procedure is called early stopping and is described, for example, in a second prior art W. Finnoff et al., Improving Model Selection by Nonconvergent Methods, Neural Networks, Vol. 6, (1993) pp. 771 to 783. Although the OBD method is also proposed there for assessing weights that are suitable for removal, this is only for the situation where the error function is at a minimum (page 775, penultimate paragraph).

Pruning methods which use an assessment variable that is used to describe the extent to which the value of the error function varies when a weight ($w_i$) is removed from the neural network are disclosed in third and fourth prior art documents, R. Reed, Pruning Algorithms—A Survey, In: IEEE Transactions on Neural Networks, Vol. 4, No. 5, September 1993, pp. 740–747; and E. D. Kamin, A Simple Procedure for Pruning Back-Propagation Trained Neural Networks, In: IEEE Transactions on Neural Networks, Vol. 1, No. 2, June 1990, pp. 239–242.

SUMMARY OF THE INVENTION

The invention is based on the problem of using a computer to determine weights that are suitable for removal from a neural network.

In general terms the present invention is a method for determining weights that are suitable for removal in a neural network, using a computer.

The training phase of the neural network is stopped before an error function, which is to be minimized in the training phase, reaches a minimum.

A first variable is defined for at least one weight of the neural network. The first variable is used to describe an assessment of the at least one weight in terms of removal of the at least one weight from the neural network, on the assumption that the error function is at the minimum.

A second variable is defined for the weight. The second variable is used to describe the extent to which the value of the error function varies when the weight varies.

A criterion variable for the weight is determined from at least the first variable and the second variable. The criterion variable is used to describe the extent to which the value of the error function varies if the weight is removed from the neural network.

The weight is classified, as a weight that is suitable for removal, if the criterion variable results in the weight being such that the removal of the weight varies the value of the error function by a value which is less than a first limit that can be predetermined.

Based on a first variable, which is determined using either the known method of optimal brain damage (OBD) or that of the optimal brain surgeon (OBS), a second variable is determined for each investigated weight, which second variable is used to describe how the error function would vary if this weight were varied. The second variable can thus be regarded as a correction term that is used to correct the termination of the training phase before the error function reaches a minimum. The first variable and second variable are now used to form a criterion variable which is respectively used to determine, for the weight, whether this weight is or is not suitable for removal from the neural network.

The formation of the second variable in the manner described above considerably improves the criterion which is used as the basis to decide whether a weight is suitable for removal from the neural network. In fact, this results in those weights being classified as being suitable for removal which also have the smallest information content in terms of the training data, and which can thus be removed without significant required information being lost. This results in the training phase being speeded up considerably, a considerable improvement in the generalization characteristic in the test phase of the neural network, and considerably faster classification in the test phase, without any major information loss.

A further advantage of the method according to the invention is that it may be used in conjunction with early stopping. This is not possible for the optimal brain damage (OBD) and optimal brain surgeon (OBS) methods. The method according to the invention thus makes it possible to combine with one another two advantageous methods for reducing the degrees of freedom in a neural network.

One development of the method makes it possible to reintroduce weights once they have been removed if it is found as the training continues further that the information content of the removed weight is greater than that of weights that have not yet been removed. This capability to reintroduce into the neural network weights that have already been removed considerably improves the flexibility of the method and thus means that removals which turn out to be unfavorable after a certain time can also be reversed again. These characteristics lead to the neural network that is finally formed having a considerably more optimal structure than was possible using known methods.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1A:
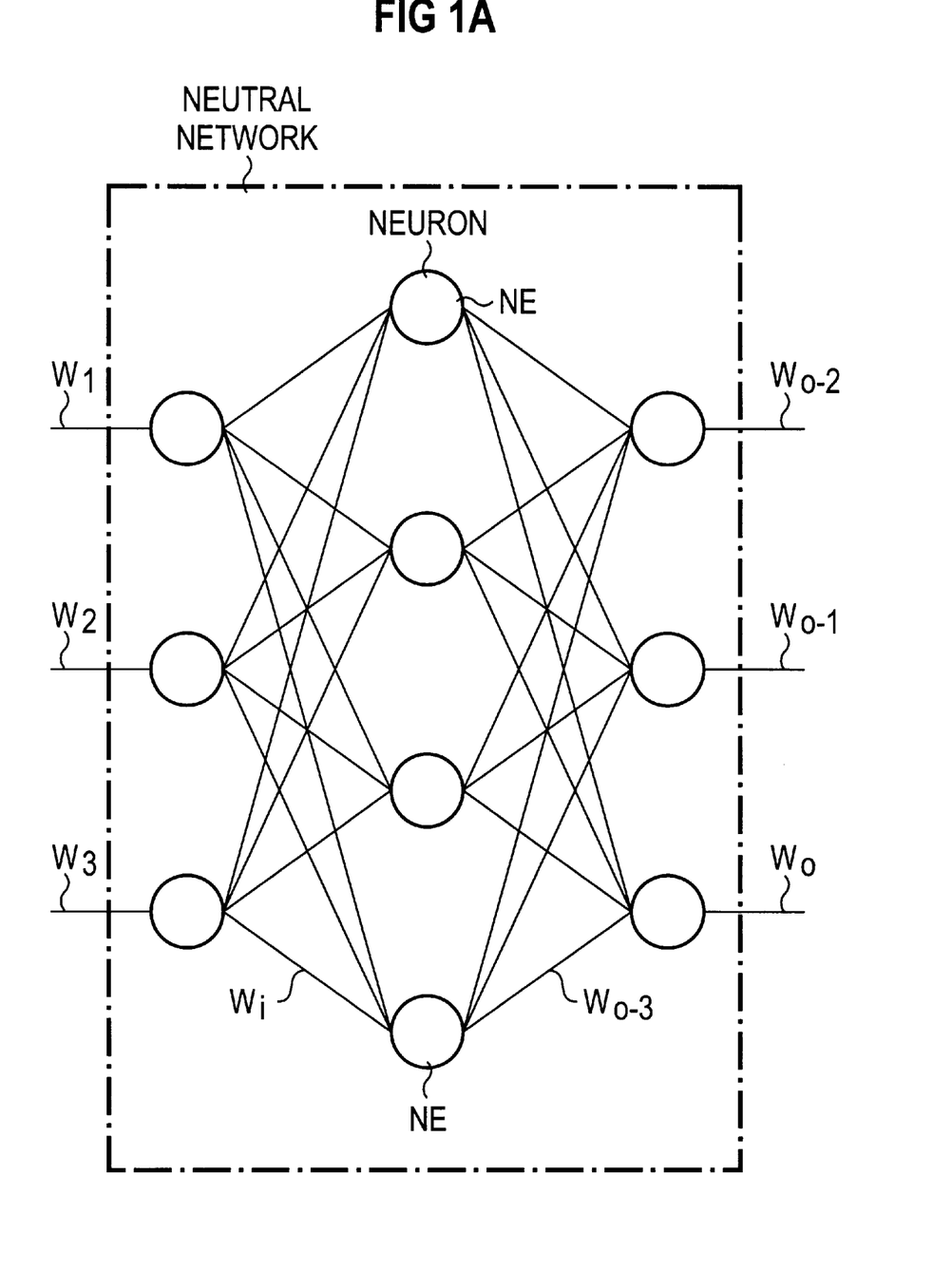
FIGS. 1a and 1b show a neural network with weights and neurons before the removal of weights (FIG. 1a) and after the removal of a number of weights (FIG. 1b)

FIG. 1a illustrates a neural network NN which, in this exemplary embodiment, has ten neurons NE, which are distributed between three layers. In this example, the individual neurons NE are each coupled to all the neurons NE in the directly subsequent layer. The couplings are in each case weighted by weights $w_i$, that is to say an output signal from a neuron NE is in each case fed, multiplied by the weight $w_i$ associated with the coupling, as the input signal to the corresponding neuron NE in the directly subsequent layer. In this case, an index i denotes each weight $w_i$ in the neural network NN unambiguously and is a natural number between 1 and o, where o represents the number of all the weights $w_i$ in the neural network NN.

Figure 1B:
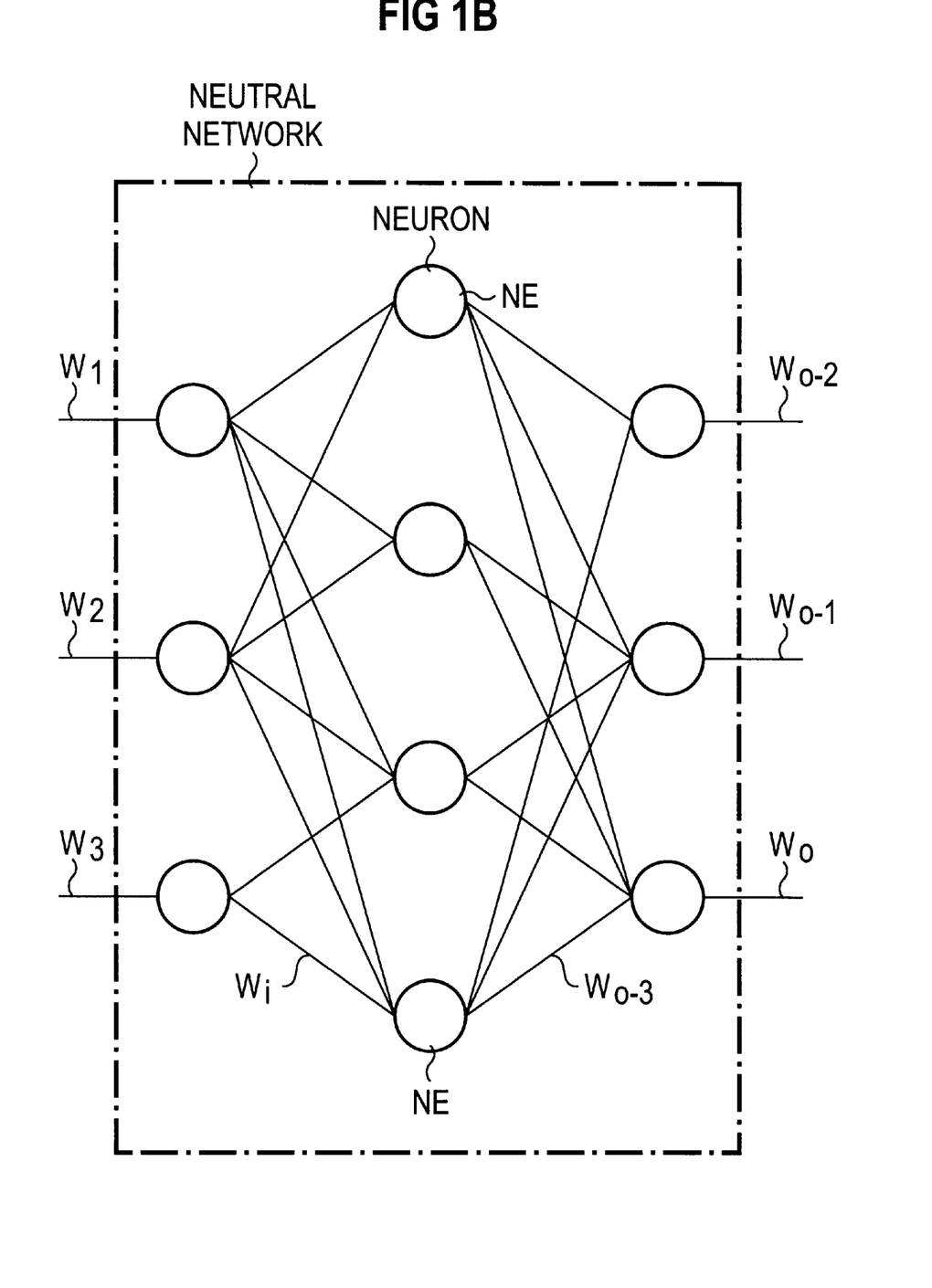

FIG. 1b shows a reduced neural network NNP, after a number of weights $w_i$ have been removed from the neural network NN using the method according to the invention.

The structure of the neural network NN which is illustrated in FIGS. 1a and 1b has no limiting character whatsoever, but is merely intended to indicate the procedure for the method according to the invention on the basis of a simple, clear example.

Figure 2:
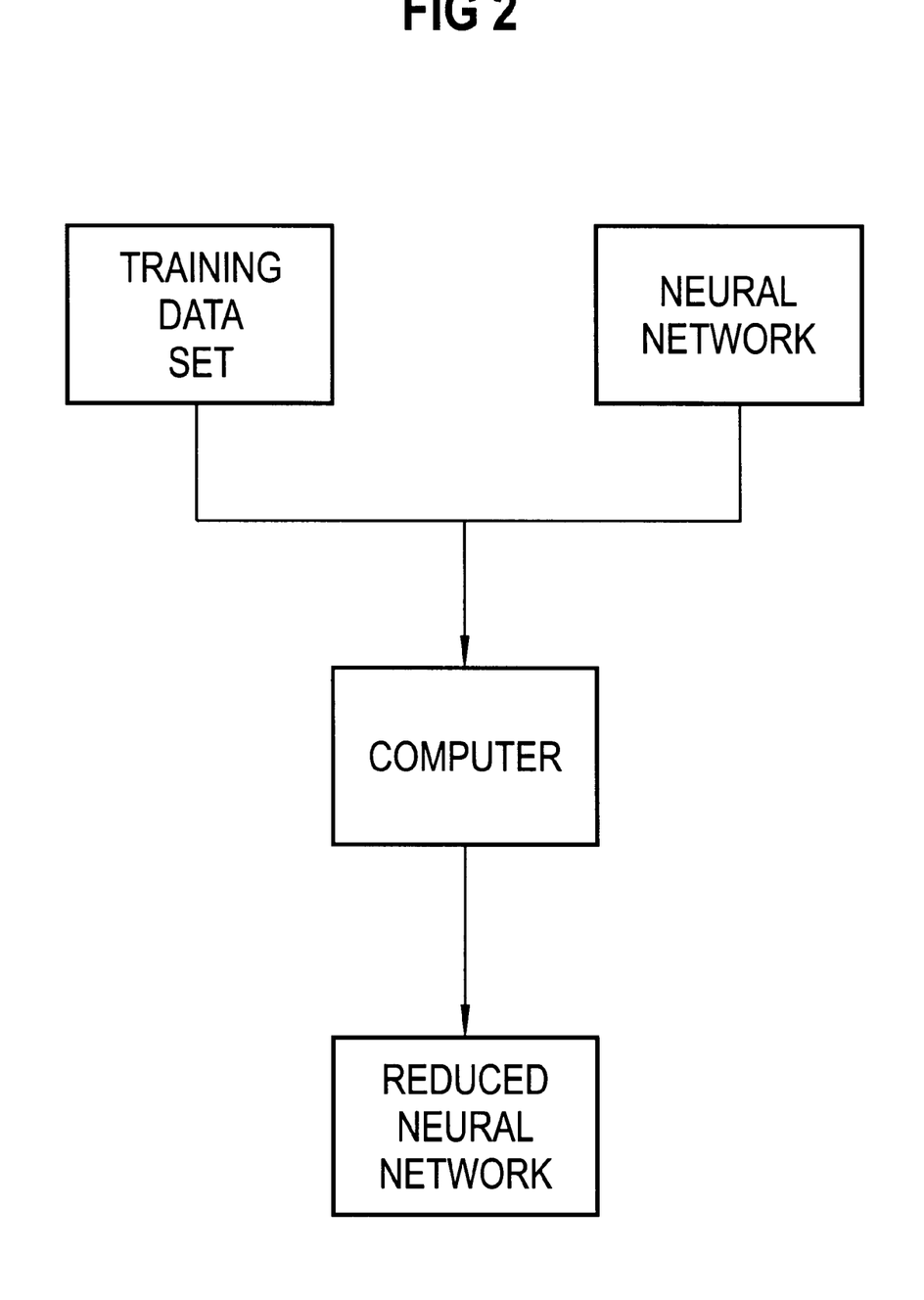
FIG. 2 shows a block diagram illustrating a computer with which the pruning method is carried out as is necessary.

FIG. 2 illustrates a computer R, using which the method according to the invention is carried out as is necessary.

In the training phase, the neural network NN is trained using a training data set TDS. The training data set TDS has a tuple of training data items $x_k$ and associated desired values $y_k$. A normal aim of a training phase for a neural network NN is to minimize an error function which, for example, describes the difference between the desired values $y_k$ for the applied training data items $x_k$. Widely differing methods are known to the person skilled in the art for this purpose, for example the back-propagation method. Other methods may be used without any limitations in this method according to the invention.

In the computer R, a reduced neural network NNP, which is illustrated in FIG. 1b, is determined in the training phase from the training data set TDS and the neural network NN.

Figure 3:
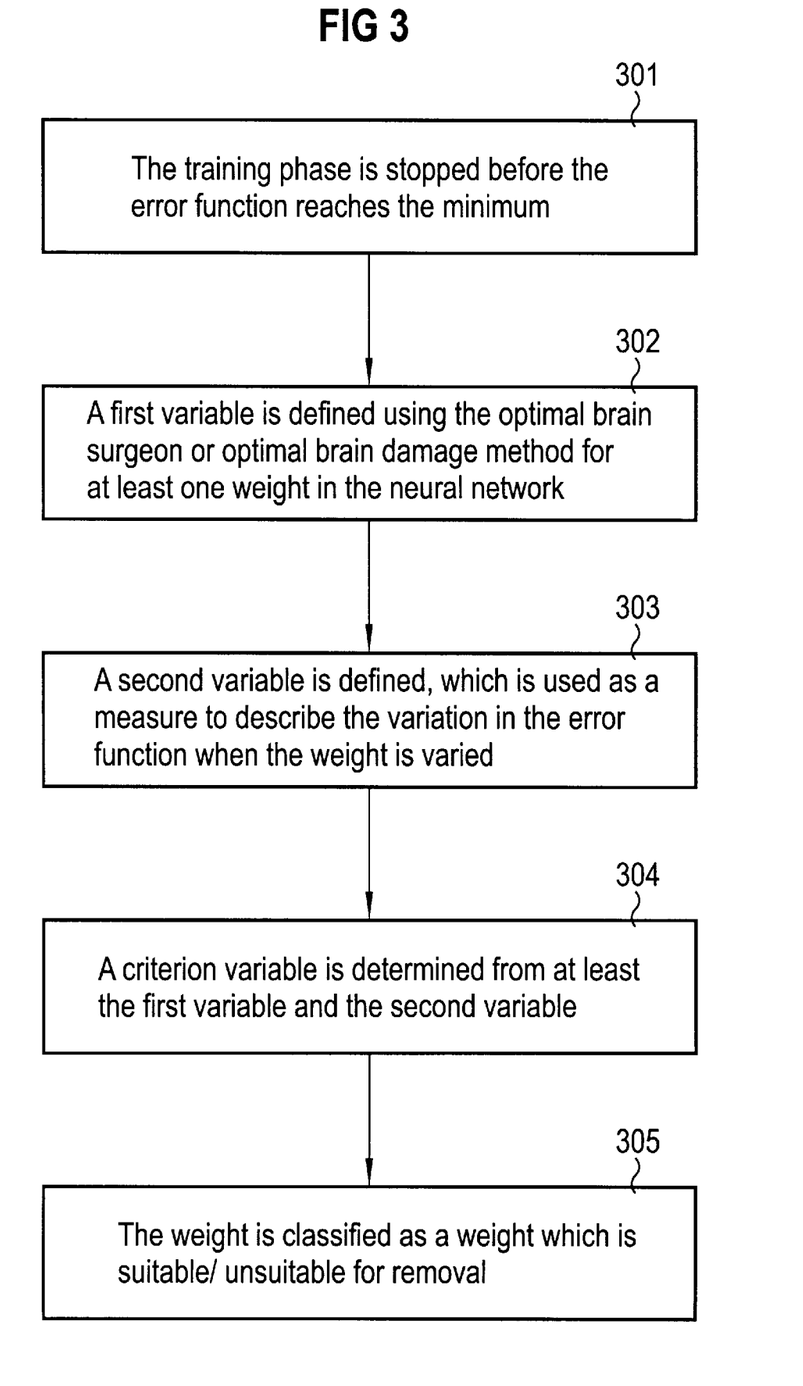
FIG. 3 shows a flowchart illustrating the individual method steps for the method according to the invention.

FIG. 3 illustrates the individual method steps in the form of a flowchart of the method according to the invention. The training phase is stopped before the error function has converged to a local or global minimum (301).

On the assumption that the error function has converged to a local minimum, a first variable EG is defined, for example using the optimal brain surgeon (OBS) or the optimal brain damage (OBD) method [1], for each weight $w_i$ to be considered in the neural network NN (302).

It is envisaged that all the weights $w_i$ in the neural network NN are to be investigated in this way. However, a variant of the method according to the invention likewise envisages only any given number, which can be predetermined, of weights $w_i$ in the neural network NN having to be considered.

A second variable ZG is defined for each weight $w_i$ considered (303). The second variable ZG is used to describe the variation in the error function when the respective weight $w_i$ varies.

The second variable ZG is determined, for example, in the following way:

$$ZG = \frac{\left( \sum_{k=1}^{K} \frac{\partial (NN(x_k) - y_k)^m}{\partial w_i} \right)^l}{M \cdot A_i} \quad (1)$$

where k denotes a first index which is in each case used to denote a training data item in the neural network unambiguously, K denotes a number of training data items which are taken into account, $x_k$ in each case denotes a training data item, $NN(x_k)$ denotes an output value of the neural network (NN) which results when the training data item $x_k$ is applied, $Y_k$ denotes a desired value which, is intended to result when the training data item $x_k$ is applied to the neural network (NN), $$\frac{\partial}{\partial w_i}$$

in each case describes the partial derivative of a function on the basis of the weight which is in each case designated by a second index (i), M describes a natural number which can be predetermined, m describes a natural number which can be predetermined, l describes a natural even number which can be predetermined, and where a curvature variable ($A_i$) is obtained from $$A_i = \sum_{k=1}^{K} \frac{\partial^2 (NN(x_k) - y_k)^m}{\partial w_i^2} \quad (2)$$

or from $$A_i = \sum_{k=1}^{K} \left( \frac{\partial NN(x_k)}{\partial w_i} \right)^m. \quad (3)$$

Furthermore, it is also possible to define the second variable ZG in the following way:

$$ZG = \frac{\left| \sum_{k=1}^{K} \frac{\partial (NN(x_k) - y_k)^m}{\partial w_i} \right|^s}{M \cdot A_i}, \quad (4)$$

where s describes a natural number which can be predetermined.

At least the first variable EG and the second variable ZG are used in a further step (304) to determine a criterion variable KG.

In a final step 305, the respectively investigated weight $w_i$ is classified either as a weight $w_i$ which is intrinsically suitable for removal from the neural network NN since the information content of the respective weight $w_i$ is low, or into a weight which is unsuitable for removal from the neural network NN.

In a development of the method according to the invention, a third variable DG is taken into account in the criterion variable KG and is formed, for example, using the following expression:

$$DG = \frac{\sum_{k=1}^{K} \partial(NN(x_k) - y_k)^m}{\partial w_i} \cdot w_i. \tag{5}$$

The criterion variable KG is thus obtained either from:

$$KG=EG+ZG \tag{6}$$

or from $$KG=EG+ZG+DG \tag{7}.$$

Considered perceptually, this procedure means that, starting from the point at which the training phase was stopped, an estimate is made of the distance between the error function point where the training phase was terminated and the local minimum of the error function. The weights which are classified as being suitable for removal from the neural network NN are those which result in either no approximation of the error function to the local minimum, or only a small such approximation.

The classification of the respective weight $w_i$ into a weight (305) which is or is not suitable for removal can be carried out in different ways.

One possibility for splitting is to investigate for the criterion variable KG whether it has a value which is less than a first limit which can be predetermined. If this is the case, the weight $w_i$ is classified as being suitable, otherwise as being unsuitable.

Alternatively, one variant of the method envisages that, rather than an absolute limit which describes the absolute information content of the weight $w_i$ in terms of the training data, a specific number of weights $w_i$ are instead intended to be removed from the neural network NN, the intention, of course, being to achieve as little information loss as possible. In this case, the first limit which can be predetermined is formed in such a way that the criterion variables KG for all the weights $w_i$ considered are compared with one another, and those weights $w_i$ are removed which respectively have the smallest values for the criterion variables KG.

The weights $w_i$ that are suitable for removal can now be removed from the neural network NN (pruning).

However, in a development of the method, it is likewise possible for a decision which is made relating to removal of a weight $w_i$ to be found to be unsuitable as the training phase or the test phase progresses, and/or for weights $w_i$ to be determined which have even less information content than weights $w_i$ that have already been removed. In this situation, a development of the method provides for the decision relating to removal of weights $w_i$ to be made reversible, by storing at least the second variable ZG or else the criterion variable KG for each weight $w_i$ removed. If it is intended to reintroduce weights $w_i$ then, from those weights $w_i$ that have already been removed, those weights $w_i$ are reintroduced whose second variable ZG is above a second limit which can be predetermined. In the same way as the first limit described above, this second limit can likewise be defined, for example, by means of a percentage, which can be predetermined, of weights $w_i$ which can be reintroduced. In this situation, the second variables ZG of all the weights $w_i$ removed are compared with one another, and those second variables ZG having the greatest values are in each case reintroduced into the structure of the neural network NN.

The method according to the invention and all its developments may be used both in conjunction with so-called off-line learning and in conjunction with so-called on-line learning.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for determining weights that are for removal in a neural network, using a computer, comprising the steps of:

stopping a training phase of the neural network before an error function, which is to be minimized in the training phase, reaches a minimum;

defining a first variable for at least one weight of the neural network, which first variable is used to describe an assessment of the at least one weight in terms of removal of the at least one weight from the neural network, based on the error function being at the minimum;

defining a second variable for the at least one weight, which second variable is used to describe an extent to which a value of the error function varies when the at least one weight varies;

determining a criterion variable for the at least one weight from at least the first variable and the second variable, which criterion variable is used to describe the extent to which the value of the error function varies if the at least one weight is removed from the neural network;

classifying the at least one weight, as a weight that is suitable for removal, if the criterion variable results in the at least one weight being such that the removal of the at least one weight varies the value of the error function by a value which is less than a first limit that is predeterminable; and removing the at least one weight that is suitable for removal from the neural network.

2. The method as claimed in claim 1, wherein the first variable is defined using an optimal brain damage method.

3. The method as claimed in claim 1, wherein the first variable is defined using an optimal brain surgeon method.

4. The method as claimed in claim 1, wherein the second variable is obtained from $$ZG = \frac{\left(\frac{\sum_{k=1}^{K} \partial(NN(x_k) - y_k)^m}{\partial w_i}\right)^1}{M \cdot A_i}$$

where

ZG is the second variable, k denotes a first index which is used to denote a training data item in the neural network unambiguously, K denotes a number of training data items which are taken into account, $x_k$ in each case denotes a training data item, $NN(x_k)$ denotes an output value of the neural network (NN) which results when the training data item $x_k$ is applied, $y_k$ denotes a desired value which is intended to result when the training data item $x_k$ is applied to the neural network, $$\frac{\partial}{\partial w_i}$$

describes a partial derivative of a function based on the weight which is designated by a second index i, M describes a natural number which is predeterminable, m describes a natural number which is predeterminable, l describes a natural even number which is predeterminable, and where a curvature variable, Ai, is obtained from one of $$A_i = \sum_{k=1}^{K} \frac{\partial^2 (NN(x_k) - y_k)^m}{\partial w_i^2}$$

and $$A_i = \sum_{k=1}^{K} \left(\frac{\partial NN(x_k)}{\partial w_i}\right)^m.$$

5. The method as claimed in claim 1, wherein the second variable is obtained from $$ZG = \frac{\left|\frac{\sum_{k=1}^{K} \partial (NN(x_k) - y_k)^m}{\partial w_i}\right|^s}{M \cdot A_i}$$

where

ZG is the second variable, k denotes a first index which is used to denote a training data item in the neural network unambiguously, K denotes a number of training data items wich are taken into account, $x_k$ denotes a training data item, $NN(x_k)$ denotes an output value of the neural network which results when the training data item $x_k$ is applied, $y_k$ denotes a desired value which is intended to result when the training data item $x_k$ is applied to the neural network, $$\frac{\partial}{\partial w_i}$$

describes a partial derivative of a function based on the weight which is designated by a second index, i, M describes a natural number which is predeterminable, m describes a natural number which is predeterminable, s describes a natural number which is predeterminable, and where a curvature variable, Ai, is obtained from one of $$A_i = \sum_{k=1}^{K} \frac{\partial^2 (NN(x_k) - y_k)^m}{\partial w_i^2}$$

and $$A_i = \sum_{k=1}^{K} \left(\frac{\partial NN(x_k)}{\partial w_i}\right)^m.$$

6. The method as claimed in claim 1, wherein a third variable is formed from the expression $$DG = \frac{\sum_{k=1}^{K} \partial (NN(x_k) - y_k)^m}{\partial w_i} \cdot w_i$$

where

DG is the third variable, k denotes a first index which is used to denote a training data item in the neural network unambiguously, K denotes a number of training data items which are taken into account, $x_k$ denotes a training data item, $NN(x_k)$ denotes an output value of the neural network which results when the training data item $x_k$ is applied, $y_k$ denotes a desired value which is intended to result when the training data item $x_k$ is applied to the neural network, $$\frac{\partial}{\partial w_i}$$

describes a partial derivative of a function based on the weight which is designated by a second index, i, m describes a natural number which is predeterminable, and wherein the third variable is taken into account in the criterion variable.

7. The method as claimed in claim 6, wherein the criterion variable results from a difference between the third variable and a sum of the first variable and the second variable.

8. The method as claimed in claim 1, wherein the selectable first limit results from a predeterminable percentage of weights to be removed, and wherein the at least one weight is classified as a weight that is suitable for removal, if the criterion variable for the at least one weight is less than criterion variables of a number of a predeterminable percentage of other weights.

9. The method as claimed in claim 1, wherein at least the second variable of the removed weight is stored, wherein a predeterminable number of weights which have already been removed but can be reintroduced are reintroduced, the weights to be reintroduced resulting from weights which have stored second variable values that are greater than a redeterminable second limit.

10. The method as claimed in claim 9,
wherein the selectable second limit results from a predeterminable percentage of weights which can be reintroduced, and
wherein the weight is reintroduced if at least the second variable for the weight is above values of at least second variables of a number of a predeterminable percentage of other weights.

11. The method as claimed in claim 1, wherein the criterion variable results from a sum of the first variable and the second variable.

* * * * *